(12) United States Patent
Bojar et al.

(10) Patent No.: US 11,037,028 B2
(45) Date of Patent: Jun. 15, 2021

(54) COMPUTER-IMPLEMENTED METHOD OF CREATING A TRANSLATION MODEL FOR LOW RESOURCE LANGUAGE PAIRS AND A MACHINE TRANSLATION SYSTEM USING THIS TRANSLATION MODEL

(71) Applicant: Charles University Faculty of Mathematics and Physics, Prague (CZ)

(72) Inventors: Ondrej Bojar, Prague (CZ); Roman Sudarikov, Prague (CZ)

(73) Assignee: Charles University Faculty of Mathematics and Physics, Prague (CZ)

( * ) Notice: Subject to any disclaimer, the term of this patent is extended or adjusted under 35 U.S.C. 154(b) by 52 days.

(21) Appl. No.: 16/237,414

(22) Filed: Dec. 31, 2018

(65) Prior Publication Data

US 2020/0210772 A1    Jul. 2, 2020

(51) Int. Cl.
*G06F 40/58* (2020.01)
*G06K 9/62* (2006.01)
*G06N 3/02* (2006.01)
*G06F 40/51* (2020.01)

(52) U.S. Cl.
CPC ........... *G06K 9/6257* (2013.01); *G06F 40/51* (2020.01); *G06F 40/58* (2020.01); *G06N 3/02* (2013.01)

(58) Field of Classification Search
USPC ...................................................... 704/2–10
See application file for complete search history.

(56) References Cited

U.S. PATENT DOCUMENTS

| | | | | |
|---|---|---|---|---|
| 5,477,451 A | * | 12/1995 | Brown | G06F 40/55 704/9 |
| 5,805,832 A | * | 9/1998 | Brown | G06F 40/44 711/1 |
| 9,104,661 B1 | * | 8/2015 | Evans | G06F 40/58 |
| 2015/0006157 A1 | * | 1/2015 | Andrade Silva | G06F 40/247 704/9 |
| 2018/0018317 A1 | * | 1/2018 | Cheng | G06F 40/242 |
| 2018/0089169 A1 | * | 3/2018 | Yamauchi | G06F 40/268 |

* cited by examiner

*Primary Examiner* — Leonard Saint Cyr
(74) *Attorney, Agent, or Firm* — Thedford I. Hitaffer; Hitaffer & Hitaffer, PLLC

(57) ABSTRACT

A computer-implemented method for creating a translation model for low resource language pairs and applicable on noisy inputs utilizing several approaches: choosing particular input corpora covering in-domain noisy and clean texts as well as unrelated but larger general parallel texts, performing several chosen methods of creating synthetic parallel corpora and filtering, pre-processing, deduplicating and concatenating training corpora.

3 Claims, 1 Drawing Sheet

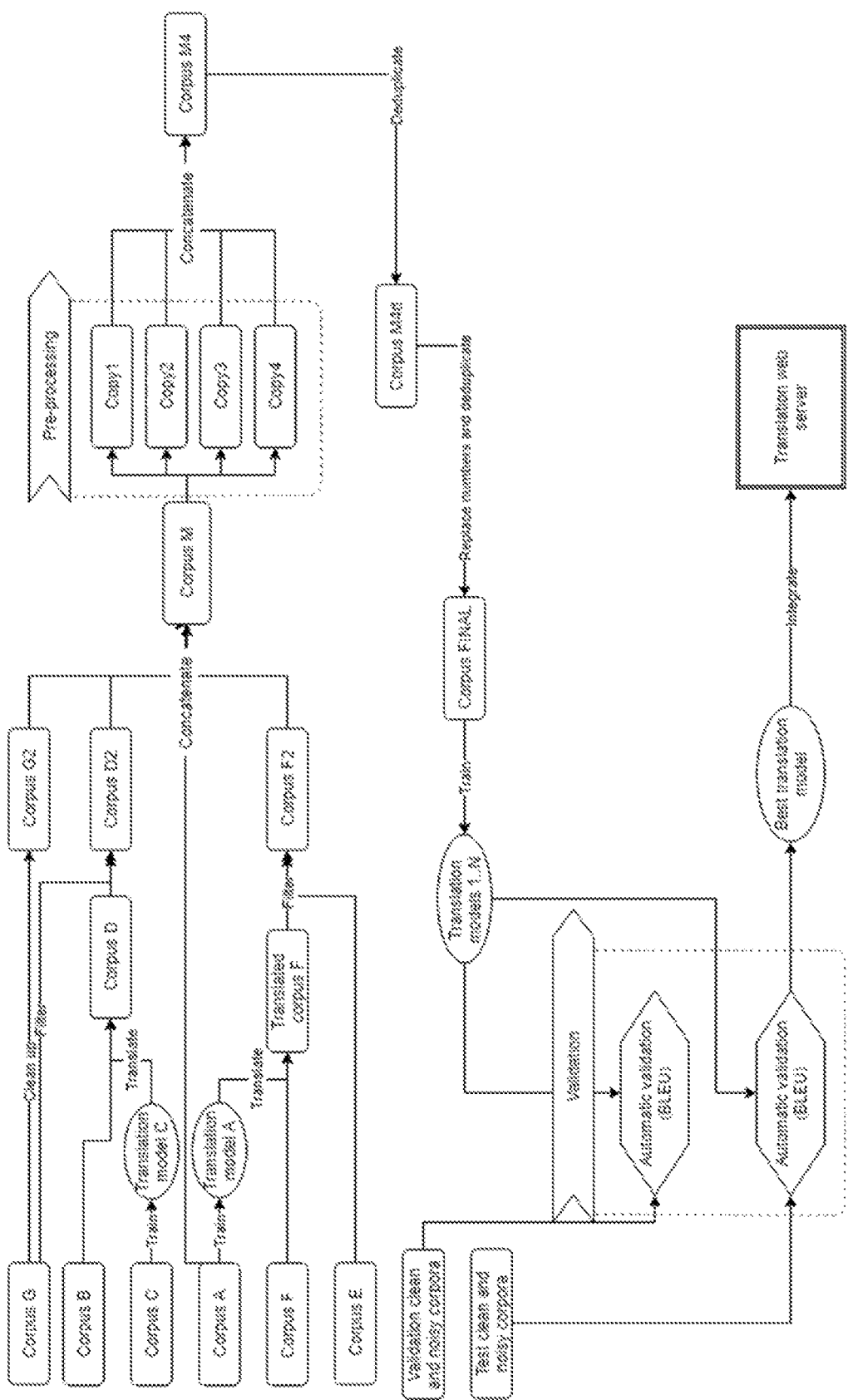

COMPUTER-IMPLEMENTED METHOD OF CREATING A TRANSLATION MODEL FOR LOW RESOURCE LANGUAGE PAIRS AND A MACHINE TRANSLATION SYSTEM USING THIS TRANSLATION MODEL

TECHNICAL FIELD

The present invention relates mainly to a field of neural machine translation, more particular to a method of creating a translation model for low resource language pairs which is tolerant to noisy inputs and a machine translation system implementing the same.

BACKGROUND ART

Current machine translation systems are statistical, in the sense that they are trained automatically using large collections of texts previously translated by humans. Such a collection of text is called a "corpus", or more precisely a "parallel corpus" to highlight that the text and its translation are available in parallel, in pairs of sentences. During the process of "training", the computer analyzes the provided examples in various ways in order to construct a compact "model" of the data. This translation model is then used to propose translations for unseen sentences.

Neural machine translation is a recently developed subfield of statistical machine translation, where the translation model has the form of a deep neural network and it is learnt using methods of deep learning.

One of the simplest techniques to benefit from corpora without existing human translation, i.e. monolingual corpora, is to use a preliminary version of the translation system and create the missing parallel side automatically, giving rise to the so called synthetic (parallel) corpus. If the original monolingual corpus was available in the target language, this process of constructing a synthetic source side is called "back-translation".

In the article "Microsoft's Submission to the WMT2018 News Translation Task: How I Learned to Stop Worrying and Love the Data", 2018 by Marcin Junczys-Dowmunt, the Author describes the solution in which a corpus F' is back-translated from corpus F using a model trained on corpus A, corpus G is filtered using conditional cross-entropy method based on corpus A, final model is trained on corpora A, F' and filtered G, and then validation performed on clean validation and test sets. Disadvantages of the solution in said article are that corpus F' introduces a lot of noise into the training corpus and also that the result of used corpuses leads to low amount of training data, while some data occurs double or multiple times.

In the article "CUNI Transformer Neural MT System for WMT18", 2018 by Martin Popel, the Author describes the solution in which corpus F is filtered using heuristic rules, then a corpus F' is back-translated from subset of corpus F using a model trained on corpus A, then the process is iterated one more time, getting corpus F", final model is trained on concatenation of corpora A and F" and then validation performed on clean validation and test sets. Disadvantages of the solution in this article are that corpus F' introduces a lot of noise into the training corpus and also that the result of used corpuses leads to low amount of training data.

Steps which are generally already known from the state of the art of machine translation systems as leading to improved translation accuracy are:

1. Back-translation, meaning training a "reverse" model to translate from target to source language and then translating a monolingual corpus in target language, thus obtaining a synthetic parallel corpus.
2. Using a parallel corpora with third language (source-third and third-target) to train third-to-target model and translate third language part of source-third corpus and thus obtaining a synthetic parallel corpus source-target.
3. Filtering sentences from a corpus, based on a heuristics or a metric which characterizes a specific domain or language feature, such as written or spoken language specifics (length of utterances, distribution of morphological categories like person), formal or informal register.
4. Concatenating genuine and synthetic parallel corpora to get more training data.

But current state of the art systems use only one source of synthetic data, be it back-translation or translation using a third language.

Training process is the process of training a neural network model or a translation model in general, where a corpus of parallel sentences is used to show the sentences to a model, so it can learn how to transform a given input in source language to an output in target language.

While most state of the art systems are dealing with cleaned inputs, translating noisy inputs, such as short text messages in tweets or SMS, is a difficult task for neural machine translation. The aim of the invention is therefore to present a method of creating a translation model for neural machine translation systems which is tolerant to noisy inputs and improves translation accuracy even for low resource language pairs.

DISCLOSURE OF INVENTION

The above-mentioned drawbacks are eliminated by a computer-implemented method of creating a translation model for low resource language pairs characterized in that it comprises following steps:

the step of receiving the following input corpora:
A genuine parallel corpus A consisting of sentences in source and target languages
A monolingual corpus E in target language
A monolingual corpus F in source language
A genuine parallel corpus B consisting of sentences in source and third languages
A genuine parallel corpus C consisting of sentences in target and third languages
Clean validation and test corpora
Noisy validation and test corpora;
A noisy genuine parallel corpus G in source and target languages the next step, in which the noisy corpus G consisting of sentences in source and target languages is further cleaned up by removing sentences which do not carry any information on the target side and resulting in a genuine parallel corpus G2;

the next step, in which a first auxiliary translation system is trained on the corpus C, said trained first auxiliary translation system is then used to translate the corpus B from third language to source language resulting in a back-translated corpus D, which is further filtered to keep only similar sentences to those contained in the noisy corpus G resulting in a synthetic parallel corpus D2;

the next step, in which a second auxiliary translation system is trained on the corpus A, said trained second auxiliary translation system is then used to translate the corpus F into target language and filtered to keep only similar sentences to those contained in the monolingual corpus E resulting in a corpus F2;

the next step of corpora concatenation and pre-processing, in which the corpora A, G2, D2 and F2 are concatenated resulting in a mixed parallel corpus M, further said corpus M is pre-processed resulting in four copies, where one copy is unaltered corpus M, the second copy is the corpus M with diacritics removed from the source language, the third copy is the corpus M with lower-cased sentences of the source language and the fourth copy is the corpus M with normalized homoglyphs and normalized Unicode in sentences of the source language, and finally said four copies are concatenated resulting in a mixed parallel corpus M4;

the next step, in which sentences in said corpus M4 are deduplicated resulting in a mixed parallel corpus M4d and then all numbers in the target language in said corpus M4d are replaced by a predefined token digits and again deduplicated resulting in a corpus FINAL;

the next step, in which training on the corpus FINAL is applied and a series of possible candidates for the translation model is collected;

the next step, in which automatic validation of created translation models using the clean validation corpus and the noisy validation corpus is done; and the final step of choosing the best performing translation model based on an automatic translation quality metric score obtained by the automatic validation.

The best performing translation model could be then integrated into any machine translation system, such as into web-server application.

The main problem solved by the invented method was to create a translation model for low resource language pairs and applicable on noisy inputs. The problem was solved by applying the following approaches. First, particular input corpora are chosen to make best use of a wider variety of possible data sources, covering in-domain noisy and clean texts as well as unrelated but larger general parallel as well as monolingual texts. While state of the art systems use only one source of synthetic data, be it back-translation or translation using a third language, the method according to this invention utilizes several chosen methods of creating synthetic parallel corpora that were specifically chosen for this purpose and then by pre-processing of the concatenated training corpus. Filtering synthetic corpus F' solves the problem of introducing a lot of noise into the training corpus in the state of the art, because it leads to much less noise when the invented method is used. Using synthetic corpora D or D2 increases the amount of training data and thus solves the problem of low amount of training data in the low resource language pairs. Pre-processing is all about working with characters on the source side. In general one way to increase robustness of neural translation models is by introducing artificial noise to the training data. The aim of the pre-processing is to give the model different sentences in the source language which will be translated into the same target sentence, for example converting to texts without diacritics, even though source language is supposed to contain diacritics. Thus that system can translate sentences without diacritics correctly. Such a robust pre-processing with diacritics/homoglyphs performed in the present method therefore makes the translation model more tolerant to noisy inputs. Deduplication techniques decrease the amount of needed stored data.

The method according to this invention is performed on a computer. Minimum requirement for the applicability of invented solution is a regular desktop computer with a GPU card of 8 or more GB of RAM equipped with necessary software, primarily a toolkit for training machine translation systems (both auxiliary/preliminary as well as final) and applying them to text to obtain its translation (e.g. Tensor2tensor or Marian). Internet connection was used during the setup phase to download all used libraries/datasets, but after that training and evaluation can be performed offline.

All input corpora are assembled before the translation model is being created. All parallel input corpora are expected to be aligned on a sentence level or must be aligned on a sentence level using standard techniques before use in the present method. Genuine parallel corpus A may be obtained from sources like OPUS (open-source parallel corpus), from subtitles from movies and television series, from TED talks transcripts, from multilingual legal documents etc. Corpus A contains texts from "general" domain, meaning that there are sentences with different contexts and vocabulary.

On the contrary, corpus G is in general of a lesser quality, thus called noisy, and contains texts from a domain, specific to a field for which the final system is expected to provide translations. Corpus G texts could be obtained for example from the final user, based on an older collection of texts that the user needed to have translated, or by targeted manual search for such domain-specific data, like collections of tweets or comments from a website. The noisy corpus G consisting of sentences in source and target languages is cleaned up by removing sentences which do not carry any information on the target side according to metric or eventually heuristic rules, thus resulting in a genuine parallel corpus G2.

Corpora B, C, E and F are texts from "general" domain without any noise.

Similarity of the sentences can be evaluated using monolingual and bilingual cross-entropy difference or other approaches such as perplexity computation. Back-translated Corpus D, which is also referred to as a synthetic corpus and consists of sentences in source and target languages, is filtered using known statistical data selection tools, e.g. XenC, to keep only similar sentences to those contained in the noisy corpus G resulting in a synthetic parallel corpus D2. The translated corpus F is filtered using a data selection tool, so it contains only sentences similar to the ones in corpus E.

Pre-processing of the corpus M with lower-cased sentences means that identical copy of the parallel corpus M with sentences in two languages, e.g. English-Czech, is created so that only all English sentences are lower-cased in order to make translation more robust and prone to input variations like letter-casing.

The fourth copy of the corpus M deals with representation of individual characters. All the text is written in Unicode but Unicode allows to represent the same character using several different sequences of bytes. Some characters can be represented by one Unicode code or by a sequence of several codes, where the start of the sequence gives the main symbol, and the following Unicode values indicate combining diacritics. All such sequences representing the same character are called canonically equivalent. Furthermore, some characters are "homoglyphs", i.e. they are technically distinct but they have the same or very similar visual form, such as 0 (zero) and O (capital letter o), or the Latin letter "a" vs. the Cyrillic letter "а". Different byte sequences for representing the same textual information would needlessly complicate the translation process. Thus one (arbitrary) form for homoglyphs ("homoglyph normalization") and one form of Unicode notation for composed characters ("Unicode normalization") is picked in sentences of the source language. The Unicode normalization in particular means converting the text first to Unicode Normalization Form D and then to Unicode Normalization Form C. The technique leads to all composable characters being represented in their short composed form.

Corpora M4 and M4d are deduplicated during this method. That means that only one pair of every source sentence-target sentence pair is kept in respective corpus, while in case of multiple occurrence duplicate pairs are removed. Even minor differences in source sentence-target sentence pairs cause that such pairs are kept in the corpus.

In deduplicated mixed parallel corpus M4d all numbers in the target language in said corpus M4d are replaced by special predefined token digits resulting in a corpus FINAL. It means that all numbers, such as "2018", "20.4", "35", are replaced by a predefined fixed number, such as "555". Therefore the system does not need to learn anything about processing different numbers. For some use cases, the source text may be provided to the end user who can easily understand from the context which number is which. If the end user needs to see the original numbers, a different strategy may be used: the numbers are replaced in the source sentence with indexed number placeholders. The first number in the source sentence is replaced with a special token NUMBER1, the second number is replaced with NUMBER2 etc. The corresponding number in the target sentence is replaced with the corresponding token regardless its position in the sentence. The indexing of the special tokens then allows to reinsert the correct number in the correct position as predicted by the translation system.

Training a translation model with the corpus FINAL is performed using well known approaches, such as tensor2tensor transformer and RNN—Recurrent neural network architectures. Automatic validation could be then performed using BLEU metric, Meteor, CHRF3 or other suitable automatic metric on both noisy and clean validation corpora. Alternatively as a "translation quality metric score" any scoring algorithm for evaluating the quality of translated text based on existing human translations could be used. In other words a model is trained on the FINAL corpus, then after one training step is finished, the model is used to translate the validation corpus from source to target language and result is compared to original target language text.

Neural network-based training produces multiple translation models, from which the best performing is picked up to be integrated into machine translation system, e.g. webserver MT Monkey. Therefore another aspect of this invention is a machine translation system having integrated the translation model obtained by the above mentioned method.

In case the input is expected to contain any form of formal markup, e.g. XML tags, HTML entities or expressions from a predefined set of patterns such as complex identifiers, variable placeholders, or even URLs, e-mail addresses and other items that can be automatically identified, a specific training and translation approaches are applied as follows:

In a preferred embodiment after M4d is created, and before FINAL corpus is produced, each particular type of the formal markup, contained in source language of the input corpus M4d or later contained in FINAL corpus, is assigned a unique class label. All markups are separated from surrounding tokens and whitespaces are retained, markups are converted to atomic tokens with unique class labels and said atomic tokens are used for target language, whereas MT system—machine translation system uses said atomic tokens as if they were normal words, while actual translation uses trained model in the way that the input text Text1 gets markup replaced, then it is sent to the translation system to be translated into text TranslatedText1 in target language and then markup is reintroduced into TranslatedText1 after M4d or FINAL is produced, while markups represented by said atomic tokens are also converted back and reintroduced into the target language copying the corresponding markups from the source language;

The level of grouping of markup expressions under the same unique label generally depends on the nature of translated text, the variability of the markup expressions and the amount of training data that includes these expressions. For HTML the tag types opening, closing, solo and the case-insensitive tag name, e.g. A, B, IMG, H1, etc. are preserved. The training data is processed to separate all expressions in form of formal markups from surrounding tokens, but the information about whitespace around these is retained for future use. All markup expressions are converted to atomic tokens expressing their unique class label, e.g. TxTxTxTTaGopenb indicates that at this position of the text, there was the opening tag B used to represent bold font in HTML. The same repertoire of identifiers has to be used in both the source and target language. An atomic token is the non-breakable sentence unit. The translating system uses these atomic tokens as if they were normal words. Web server system such as Neural MT systems easily learn which of these tokens constitute a specific type of bracketing and learn to reintroduce them at appropriate places in the translated text. During translation process, markups contained in any input corpus, for example HTML tags, are converted to these atomic tokens hiding for example all details, such as additional attributes of HTML tags, then the remaining text is translated, finally those atomic tokens are converted back to original tags with all the details, simply copying the corresponding tags from the source. Reordering of tags is allowed, based on training the translating system, for example machine translation system, is free to move them around in the sentence and even change their mutual order.

In a preferred embodiment a detokenizer is trained and used to correctly place spaces into translated text in target language. The standard tokenizers are rule-based and language specific. Depending on the typesetting convention in the particular target languages, spaces are preserved on one or both sides of specific punctuation marks. Some languages impose even fixed rules on the order of punctuation marks. For instance, the US and British English rules seem to differ in preferred handling of the final full stop and the closing quote. To cater for the two styles, a rule-based detokenizer would need to explicitly get the information if US or British style of output is expected. Our trained detokenizer learns and follows the conventions captured implicitly in its training corpus, a target-language-only plain text in its original, non-tokenized, form.

Detokenizer is trained to correctly place spaces in the output translated text so it recognizes where those spaces should be preserved and which spaces should be removed in particular contexts. It could be done e.g. using the NameTag tagger. Specifically, we take the original non-tokenized text and apply overly eager rule-based tokenization, inserting token boundary at all places where the token boundary can theoretically happen. We preserve the information as to whether there was an explicitly written space at each such position. A classifier is trained on a large set of such examples, to predict if the given context of tokens needs the explicit space at the given token boundary or not. This technical implementation plays well with our handling of markup described above: The detokenizer is trained on the stream of tokens with our special tokens for markup, learning easily if the particular type of markup symbols should be separated from the surrounding text by spaces.

Beside the described complex setup of tools, the minimum requirement for the applicability of invented solution is a regular desktop computer with a GPU card of 8 or more GB of RAM. Internet connection is needed during the setup phase to download all used libraries/datasets, but after that training and evaluation can be performed offline. Therefore a computer system comprising means adapted for carrying out each of the steps of the above described computer-implemented method of creating a translation model for low resource language pairs is another part of the invention.

BRIEF DESCRIPTION OF DRAWINGS

The attached drawing serves to illustrate the invention, where FIG. 1 shows a basic scheme depicting steps of the method according to claim 1.

MODES FOR CARRYING OUT THE INVENTION

The computer-implemented method of creating a translation model for low resource language pairs which is tolerant to noisy inputs according to this invention is presented in the following embodiments.

Two different neural translation models were used: one based on attention-based encoder-decoder model Nematus and the other based on tensor2tensor transformer translation. Both neural translation models were integrated into MT Monkey translation web service in the local user's network. Encoder-decoder approach was used to train translation models.

In the first embodiment performed according to the scheme of FIG. 1, the source language was Vietnamese, the target language was Czech, the third language was English. All parallel corpora were aligned on the sentence level. First of all input corpora were collected manually or downloaded from the Internet. The obtained input corpora were as follows:
  the genuine parallel corpus A consisting of sentences in Vietnamese source and Czech target languages, the source for the corpus A was Wikipedia, OPUS, open parallel corpus, from subtitles from movies and television series and from TED talks transcripts, containing pair sentences e.g.
    source language sentence:
      Phép thuât nhà ở trên cây là gì?
      Được rồi, đây là điều tôi muốn.
    target language sentence:
      V čem spoěivá kouzlo domě v korunách stromů.
      Toto jsou moje podmínky.
  A monolingual corpus E in Czech target language, the source for the corpus E was public News Crawl corpus 2007-2017, containing sentences e.g.
    target language sentences:
      Koruna stromu je nad stromem.
      Kouzlo je . . .
      Tento zápas nám dodal sebevědomí.
  A monolingual corpus F in Vietnamese source language F, the source for the corpus F was OPUS, open parallel corpus, from subtitles from movies and television series and from TED transcripts, containing sentences e.g.
    source language sentences:
      Chú bảo đã m cháu sẽđược nhảy xuống bể bo O' trong 24 giờ nữa.
  A genuine parallel corpus B consisting of sentences in Vietnamese source and English third languages, the source for the corpus B was OPUS, open parallel corpus, from subtitles from movies and television series and from TED transcripts, containing sentences e.g.
    source language sentences:
      Chúng ta đang ở tầng 24 dưới mặt đất, đây là nơi nghiên cứu chính của chúng tôi.
    third language sentences:
      We're now 24 floors beneath the surface, and here's our main research facility.
  A genuine parallel corpus C consisting of sentences in Czech target and English third languages, the source for the corpus C was a public Czech-English corpus CzEng created by the applicant and available at http://ufal.mff.cuni.cz/czeng, containing sentences e.g.
    target language sentences:
      Ano! Ale potřebuju, abys tomu dal 105%.
    third language sentences:
      But I need you to give it 105%.
  A clean validation and test corpora, originating in the test set accompanying the Czech-English corpus CzEng defined above,
  A Vietnamese-Czech noisy validation and test corpora, the source for those validation and test corpora are manual user-generated texts in source language (Vietnamese), translated by professional translators (into Czech).
  corpus G, the source for that corpus is manual user-generated texts in source language, translated by professional translators.

In other examples genuine parallel corpus A is obtained from Czech-English sources like subtitles, Wikipedia articles, EU legislation—EuroParl, Fiction novels, Parallel web pages, Technical, Medical, PDFs from web, News, Navajo, Tweets, etc.

The main source of in-domain source and target sentences is the noisy corpus G:
  source language sentences:
    Bạn cho tôi tỷ
    A ve di, e co viec
    Odesilatel: Facebook, Obsah: Zřetězená zpráva č.154-1. část ze 3: Xác nhận! Để sửa tùy chọn SMS, vào m.facebook.com/settings. Để tắt
  target language sentences:
    Dáte miliardy
    Jdi domů, mám práci
    Potrvdit! Na opravu volby SMS jdi na m.facebook.com/settings. Na vypnutí
said corpus G is further cleaned up by removing sentences which do not carry any information on the target side, e.g.:
  source language sentence removed by this cleanup: Odesilatel: Facebook, Obsah: Zřetězená zpráva č.154-1. část ze 3: Xác nhận! Để sửa tùy chọn SMS, vào m.facebook.com/settings. Để tắt
  target language sentence: Potrvdit! Na opravu volby SMS jdi na m.facebook.com/settings. Na vypnuti
  English gloss: From: Facebook, Content: Part 1 of 3 of message ID 154: Confirm! To edit SMS options, go to m.facebook.com/settings. To turn off and resulting in a genuine parallel corpus G2;

A first auxiliary translation system was trained on the corpus C, particularly Tensor2tensor transformer model for Neural Machine translation models is used, said trained first auxiliary translation system is then used to translate the corpus B from third language to source language, resulting in a back-translated corpus D, which is further filtered to keep only similar sentences to those contained in the noisy corpus G resulting in a synthetic parallel corpus D2;

Back-translated Corpus D is also referred to as synthetic corpus, consisting of sentences in source and target languages. Sentences from corpus D similar to sentences in corpus G are selected using XenC data selection tool, based on monolingual and bilingual cross-entropy difference. Alternatively in the next embodiment, dual conditional cross-entropy filtering approach described in the article "Microsoft's Submission to the WMT2018 News Translation Task: How I Learned to Stop Worrying and Love the Data", 2018 was used.

A second auxiliary translation system is trained on the corpus A, particularly the Tensor2tensor transformer model for Neural Machine translation models is used, said trained second auxiliary translation system is then used to translate the corpus F into target language and resulting in a corpus F1 which is further filtered using a language identification tool to keep only similar sentences to those contained in the corpus E based on the monolingual corpus E resulting in a corpus F2; similarity of the sentences is evaluated the same as for corpus D2, using monolingual and bilingual cross-entropy.

Corpora A, G2, D2 and F2 where concatenated resulting in a mixed parallel corpus M:

Corpus M:
source language sentences:
Được rồi, đây là điều tôi muốn.
Bạn cho tới tỷ
A ve di, e co viec
target language sentences:
Toto jsou moje podmínky.
Dáte miliardy
Jdi domů, mám práci further in the step of separate pre-processing of said corpus M resulting in four copies, where one copy is unaltered corpus M, e.g.
source language sentences:
Được rồi, đây là điều tôi muốn.
target language sentences:
Toto jsou moje podmínky.

the second copy is the corpus M with diacritics removed from the source language, e.g.
source language sentences:
Duoc roi, day la dieu toi muon.
target language sentences:
Toto jsou moje podmínky.

the third copy is the corpus M with lower-cased sentences of the source language, e.g.
source language sentences:
được rồi, đây là điều tôi muốn.
target language sentences:
Toto jsou moje podminky.

and the fourth copy is the corpus M with normalized homoglyphs and normalized Unicode in sentences of the source language, e.g.

source language sentences:
Được rồi, đây là điều tôi muốn.
target language sentences:
Toto jsou moje podmínky.

and finally in the step in which said four copies are concatenated resulting in a mixed parallel corpus M4:

Corpus M4:
source language sentences:
Được rồi, đây là điều tôi muốn.
Duoc roi, day la dieu toi muon.
được rồi, đây là điều tôi muốn.
Được rồi, đây là điều tôi muốn.
target language sentences:
Toto jsou moje podmínky.
Toto jsou moje podmínky.
Toto jsou moje podmínky.
Toto jsou moje podmínky.

Sentences in said corpus M4 are deduplicated resulting in a mixed parallel corpus M4d Corpus M4d:
source language sentences:
Được rồi, đây là điều tôi muốn.
Duoc roi, day la dieu toi muon.
ừ c rồi, đây là điều tôi muốn.
target language sentences:
Toto jsou moje podmínky.
Toto jsou moje podmínky.
Toto jsou moje podmínky.

and then all numbers in the the target language in said corpus M4d are replaced by special token digits and sentence pairs are deduplicated resulting in a corpus FINAL;

Corpus FINAL with token digits:
source language sentences:
Nhưng tôi cần cậu cho 105% đó.
Nhưng tôi cần cậu cho 10% đó.
target language sentences:
Ano! Ale potřebuju, abys tomu dal DIGITS %.
Ano! Ale potřebuju, abys tomu dal DIGITS %.

then a translation model is trained using Transformer neural network-based approach on the corpus FINAL;

Neural machine translation system provides multiple models during the training process. Additionally if different machine translation systems are used, then after the training it can be evaluated which machine translation system performed better.

While the translation model is trained on the training data, its performance is checked on the independent set of data. The automatically assessed translation quality on the validation corpora serves as a realistic estimate of the final performance on the real test corpora. Usually Clean and Noisy validation and test corpora are used for automatic validation using BLEU—Bilingual Evaluation Understudy metric. Validation on validation corpora is performed during the model training process automatically, validation on test corpora is performed after the whole training process is done. This validation on test corpora is done automatically based on metrics like BLEU.

Validation on both noisy and clean validation corpora were performed with use of Marian and Tensorflow tensor2tensor translation systems.

The best performing translation model was chosen based on an automatic translation quality metric score obtained by the automatic validation for integration into web-server application MT Monkey system.

In the second embodiment the previously described first embodiment is extended about handling markups in the case when the input is expected to contain any form of formal markup, e.g. XML tags, HTML entities or expressions from a predefined set of patterns, such as complex identifiers, variable placeholders, or even URLs, e-mail addresses and other items that can be automatically identified. A specific training and translation approaches is described as follows. In this second embodiment each particular type of the formal markup contained in source language of the input corpora A or G is assigned a unique label.

For HTML the tag types opening, closing, solo and the case-insensitive tag name e.g. A, B, IMG, H1, etc. are preserved.

Machine translation system is trained with said atomic tokens as if they were normal words and then markups represented by said atomic tokens are converted back and reintroduced into the target language in copying the corresponding markups from the source corpus. Following table demonstrates the above mentioned:

| Row | Source | | Target | Comment |
|---|---|---|---|---|
| 1 | Original Form | Hello, <a href="LINK"><b>world</b></a>. | Ahoj, <a href="LINK"><b>světe</b></a>. | |
| 2 | Preprocessed (tokenized and markup expressed as special tokens). | Hello TxTxTxTTaGopena TxTxTxTTaGopenb world TxTxTxTTaGcloseb TxTxTxTTaGclosea . | Hello TxTxTxTTaGopena TxTxTxTTaGopenb world TxTxTxTTaGcloseb TxTxTxTTaGclosea . | The translation system is trained to process and produce this format. Note that fine-grained details such as the specific LINK in the <a> tag are not present in this format. |
| 3 | New input sentence | Click <a href="URL">here</a>. | | |
| 4 | Preprocessed and translated by the trained model. | Click TxTxTxTTaGopena here TxTxTxTTaGclosea . | Klepněte TxTxTxTTaGopena sem TxTxTxTTaGclosea . | The translation system learned that the source "word" TxTxTxTTaGopena should be translated as (identical) target "word" TxTxTxTTaGopena. It also had the opportunity to consider the context of surrounding words or other tokens, to handle any reorderings or movements. |
| 5 | Output after post-processing but before detokenization. | | Klepněte <a href="URL">sem</a>. | From the correspondence between the source as represented in words 3 and 4 in this illustration, we know that e.g. TxTxTxTTaGopena was used to encode <a href="URL">. We use this mapping when post-processing target in row 4 to target in row 5 (the final output). |

The training data is processed to separate all expressions in form of formal markups from surrounding tokens, but the information about whitespace around these is retained for future use. All markup expressions are converted to atomic tokens expressing their class label, e.g. TxTxTxTTaGopenb indicates that at this position of the text, there was the opening tag B used to represent bold font in HTML. The same repertoire of identifiers has to be used in both the source and target language.

The level of grouping of markup expressions under the same unique label generally depends on the nature of translated text, the variability of the markup expressions and the amount of training data that includes these expressions.

Web server application such as Neural MT systems easily learn which of these tokens constitute a specific type of bracketing and learn to reintroduce them at appropriate places in the translated text.

During translation process, markups contained in the input corpus A or G e.g. tags are converted to these simple identifiers of markups converted into atomic tokens hiding for example all details, such as additional attributes of HTML tags, then the rest text is translated, finally those atomic tokens are converted back to original tags with all the details, simply copying the corresponding tags from the source. Reordering of tags is allowed. Based on training and translation process MT system is free to move them around in the sentence and even change their mutual order.

In the third embodiment, detokenizer is trained to correctly place spaces in the output translated text so it recognizes where those spaces should be preserved and which spaces should be removed in particular contexts. It is done e.g. using the NameTag (http://ufal.mff.cuni.cz/nametag) tagger. The example below talks about a classifier making the decision about keeping or removing space at every decision point. The NameTag tagger runs this classifier for the whole sequence of tokens with many decision points at once, making optimal decision not only at each decision point independently but considering the decisions made at all decision points in the sentence.

Example of detokenization:
Original non-tokenized text:
(c) "Community carrier" means an air carrier according to Council Regulation (EEC) No 2407/92 of 23 Jul. 1992;

Converted to training data for the classifier: Each token DECIDE-SPACE indicates a decision point where the classifier is expected to predict to keep the space as token delimiter. Each token DECIDE-JOIN indicates a decision point where the classifier is expected to predict to remove the space, i.e. immediately join the two neighbouring tokens:

(DECIDE-JOIN c DECIDE-JOIN) DECIDE-SPACE "DECIDE-JOIN Community DECIDE-SPACE carrier DECIDE-JOIN" DECIDE-SPACE means DECIDE-SPACE an DECIDE-SPACE air DECIDE-SPACE carrier DECIDE-SPACE according DECIDE-SPACE to DECIDE-SPACE Council DECIDE-SPACE Regulation DECIDE-SPACE (DECIDE-JOIN EEC DECIDE-JOIN) DECIDE-SPACE No DECIDE-SPACE 2407 DECIDE-JOIN/DECIDE-JOIN 92 DECIDE-SPACE of DECIDE-SPACE 23 DECIDE-SPACE July DECIDE-SPACE 1992 DECIDE-JOIN;

Tokenized output of our system:
(d) "tour operator" is defined in Article 2, point 2, of Council Directive 90/314/EEC of 13 Jun. 1990;

Preparation for the classifier: The output tokens are interleaved with DECIDE tokens:

(DECIDE d DECIDE) DECIDE "DECIDE tour DECIDE operator DECIDE" DECIDE is DECIDE defined DECIDE in DECIDE Article DECIDE 2 DECIDE, DECIDE point DECIDE 2 DECIDE, DECIDE of DECIDE Council DECIDE Directive DECIDE 90 DECIDE/DECIDE 314 DECIDE/DECIDE EEC DECIDE of DECIDE 13 DECIDE June DECIDE 1990 DECIDE;

Decisions by the classifier: At each of these DECIDE tokens, the trained classifier will predict either DECIDE-JOIN or DECIDE-SPACE:

(DECIDE-JOIN d DECIDE-JOIN) DECIDE-SPACE "DECIDE-JOIN tour DECIDE-SPACE operator DECIDE-JOIN" DECIDE-SPACE is DECIDE-SPACE defined DECIDE-SPACE in DECIDE-SPACE Article DECIDE-SPACE 2 DECIDE-JOIN, DECIDE-SPACE point DECIDE-SPACE 2 DECIDE-JOIN, DECIDE-SPACE of DECIDE-SPACE Council DECIDE-SPACE Directive DECIDE-SPACE 90 DECIDE-JOIN/DECIDE-JOIN 314 DECIDE-JOIN/DECIDE-JOIN EEC DECIDE-SPACE of DECIDE-SPACE 13 DECIDE-SPACE June DECIDE-SPACE 1990 DECIDE-JOIN;

Final output: Spaces are preserved at DECIDE-SPACE and removed at DECIDE-JOIN:
(d) "tour operator" is defined in Article 2, point 2, of Council Directive 90/314/EEC of 13 Jun. 1990;

All embodiments were performed on a computer with minimum requirement for the applicability of invented solution is a regular desktop computer with a GPU card of 8 or more GB of RAM equipped with necessary software, primarily a toolkit for training machine translation systems (both auxiliary as well as final) and applying them to text to obtain its translation (e.g. Tensor2tensor or Marian). Internet connection was used during the setup phase to download all used libraries/datasets, but after that training and evaluation can be performed offline.

INDUSTRIAL APPLICABILITY

An invented computer-implemented method of machine translation is mainly intended for in-house machine translation of noisy inputs in low data conditions. Further it can be deployed as a web-based translation service for various user-generated short messages (which are prone to contain the handled type of noise), e.g. Facebook posts, tweets or SMS messages.

The invention claimed is:
1. A computer-implemented method of creating a translation model for low resource language pairs, the method comprising the steps of:
   a) receiving the following input corpora:
      a genuine parallel corpus (A) consisting of sentences in source and target languages,
      a monolingual corpus (E) in target language,
      a monolingual corpus (F) in source language,
      a genuine parallel corpus (B) consisting of sentences in source and third languages,
      a genuine parallel corpus (C) consisting of sentences in target and third languages,
      clean validation and test corpora,
      noisy validation and test corpora, and
      a noisy genuine parallel corpus (G) in source and target languages,
   b) cleaning up the noisy corpus (G) consisting of sentences in source and target languages by removing sentences that do not carry any information on the target side resulting in a genuine parallel corpus (G2),
   c) training a first auxiliary translation system on the corpus (C) and using the trained first auxiliary translation system to translate the corpus (B) from third language to source language resulting in a back-translated corpus (D), which is further filtered to keep only similar sentences to those contained in the noisy corpus (G) resulting in a synthetic parallel corpus (D2),
   d) training a second auxiliary translation system on the corpus (A), using the trained second auxiliary translation system to translate the corpus (F) into target language, which is filtered to keep only similar sentences to those contained in the monolingual corpus (E) resulting in a corpus (F2),
   e) concatenating the corpora (A), (G2), (D2) and (F2) resulting in a mixed parallel corpus (M), pre-processing the corpus (M) resulting in four copies, wherein one copy being unaltered corpus (M), a second copy being the corpus (M) with diacritics removed from the source language, a third copy being the corpus (M) with lower-cased sentences of the source language and a fourth copy being the corpus (M) with normalized homoglyphs and normalized Unicode in sentences of the source language, and concatenating the four copies resulting in a mixed parallel corpus (M4),
   f) deduplicating sentences in the corpus (M4) resulting in a mixed parallel corpus (M4d) and replacing all numbers in the target language in the corpus (M4d) by predefined token digits and repeating the deduplicating step resulting in a corpus (FINAL), g) applying training on the corpus (FINAL) and collecting a series of possible candidates for the translation model,
h) automatically validating created translation models using the clean validation corpus and the noisy validation corpus, and
i) choosing the best performing translation model based on an automatic translation quality metric score obtained by the automatic validation.

2. A computer system comprising means adapted for carrying out each of the steps of the method according to claim 1.

3. A machine translation system having integrated the translation model obtained by the method of claim 1.

* * * * *